Oct. 28, 1947.  A. VON HIPPEL ET AL  2,429,655
SELENIUM ELEMENT AND TREATMENT
Filed Nov. 21, 1942

INVENTORS
ARTHUR VON HIPPEL
JAMES H. SCHULMAN
BY
ATTORNEY

Patented Oct. 28, 1947

2,429,655

UNITED STATES PATENT OFFICE 2,429,655

SELENIUM ELEMENT AND TREATMENT

Arthur von Hippel, Weston, and James H. Schulman, Cambridge, Mass., assignors, by mesne assignments, to Federal Telephone and Radio Corporation, New York, N. Y., a corporation of Delaware Application November 21, 1942, Serial No. 466,489

7 Claims. (Cl. 175—366)

This invention relates to selenium rectifiers and has for its object to provide an efficient method of applying a "blocking layer" to the selenium surface to improve the rectifying characteristics and an improved blocking layer.

In accordance with our invention the blocking layer is applied by an anodic treatment of the selenium surface in a soluble chromate or dichromate solution.

Selenium rectifier elements ordinarily comprise a layer of selenium adhering to a suitable base plate or element such as steel or aluminum, the selenium being heat-treated in a well-known manner at a temperature below the melting point of selenium in order to crystallize the selenium to place it in condition for use as a rectifier. A counter-electrode is then ordinarily placed over the annealed selenium surface, and this is usually applied by spraying a metallic substance such as Wood's metal on the surface. As a factor in obtaining a good rectifying characteristic, it is desired that the current flow in the reverse direction shall be made small; and it is also desired that the cell be made to withstand a considerable voltage. Various proposals have heretofore been made to reduce the reverse current and to raise the volts which can be applied, by the application of various substances to the surface of the annealed selenium layer before the application of the counter-electrode. For example, it has been proposed to coat the selenium surface with lacquers or with sulfur and it has also been proposed (Patent 2,197,497) to expose the selenium surface to selenium dioxide vapor in a humid atmosphere.

The anodic treatment of the selenium surface in accordance with our present invention has the advantage of placing a "blocking layer" on the selenium surface of a thickness and quality which can be readily controlled by the factors associated with the plating bath such as the strength of solution, the current flow and the time of treatment. A solution containing hexavalent chromium in the anion can be used for the treatment.

Figure 1:
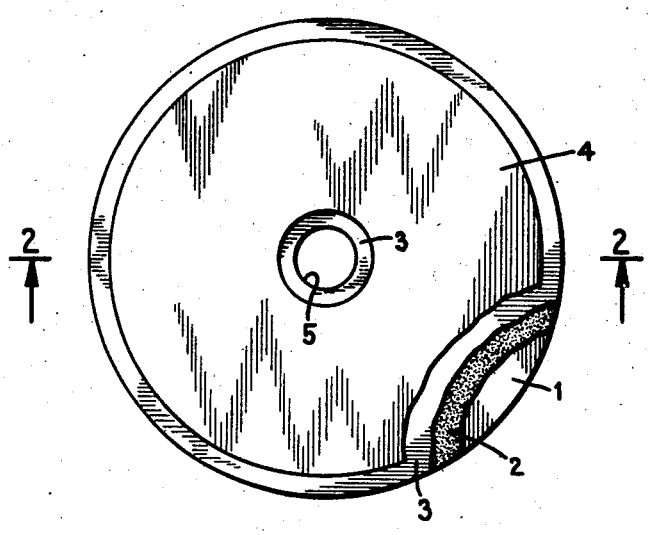
Figure 2:
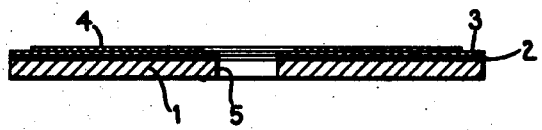

In the drawing Fig. 1 is a plan view and Fig. 2 is a side elevation in cross section of a selenium element having a blocking layer in accordance with this invention.

Figs. 1 and 2 show a well-known form of selenium disc such as is used for a rectifier. It comprises a base plate 1, ordinarily of steel on which is placed a layer of selenium 2. According to a common practice the base plate is shown with a central hole 5. The selenium may be applied in some suitable manner as by melting amorphous selenium powder and spreading the molten selenium over the base plate and then allowing it to cool and harden. The selenium should then be annealed in a well-known manner by heating it for a period of time at a high temperature not exceeding the melting point, in order to induce crystallization and enable the cell to operate properly. A suitable way of carrying out such a heat treatment is, for example, disclosed in Presser Patent No. 1,743,160. The heat treatment can be carried out by first compressing the selenium-coated disc in a press and heating it for about a half hour at a temperature of about 120° C., then removing the pressure and raising the temperature to about 214° C. for some hours. The disc with its crystallized metallic form of selenium layer 2 then has applied over the selenium surface a blocking layer 3 in accordance with our invention. The blocking layer 3 will ordinarily be of minute thickness, and not as thick as indicated by the drawing wherein its thickness is exaggerated for the purpose of illustration.

The blocking layer may be applied by an anodic treatment in a chromic acid solution. The solution used in our anodic treatment may be made by dissolving chromic oxide ($CrO_3$) in water. This solution is generally understood to comprise the compounds $H_2CrO_4$ and $H_2Cr_2O_7$, both existing together in the solution, probably in some definite proportion of equilibrium in respect to each other. This is considered to be chromic acid. Suitable concentrations of the solution may be allowed to lie within quite wide limits; for example proportions ranging from about ½% to about 10% by weight of $CrO_3$ in water have been used.

Other solutions of soluble chromates or dichromates could be used as for instance the chromates or dichromates of sodium, potassium or ammonium.

To perform the anodic treatment, the plate or element containing the annealed selenium layer is made the anode in this solution; and if desired, the back of the plate may be blocked from the solution by painting it with an insulating lacquer or the like or by putting it in a suitable holder which will not admit the solution to the back of the plate. For the cathode, a suitable conductor may be used, but preferably an inactive substance such as carbon or platinum. Silver, copper or iron could probably be used also if desired.

The rate at which the blocking layer is formed is dependent upon the concentration of the solution and the current density. Current densities ranging from around 3 amperes to around 25 amperes per square foot of area have been used with the above ranges of solution concentration, and it will be understood that wide latitude is permissible in the current density to be used. The time of the treatment may likewise vary correspondingly, times of ¼ to 4 minutes having been found satisfactory for the above ranges. It will be understood that the time and also the current density and solution concentration may be varied widely in accordance with the thickness and quality of blocking layer desired.

The composition of the blocking layer is chromium or a chromic deposition product.

After the anodic treatment, the solution may be rinsed off with water and the water in turn may be rinsed off with alcohol or acetone to dry it quickly. Then the surface of the blocking layer can be sprayed in a well-known manner with the counter-electrode substance 4 such as Wood's metal which makes an intimate contact with the blocking layer.

Following the application of the counter-electrode the selenium element will ordinarily be electro-formed, in accordance with a usual practice, by the application of voltage in the reverse direction between the base and the counter-electrode. This electro-forming will raise the voltage which the element can withstand still further and will also decrease its reverse current. The voltage and reverse current characteristics obtained after the electro-forming will, of course, be dependent upon the quality of the blocking layer which has been applied.

Rectifiers thus treated have a very high ratio of forward to reverse current and can withstand considerably higher voltages with passage of much lower reverse current than when not thus treated.

As a specific example it was found that when a 44 mm. diameter disc was treated for two minutes in a 1% solution of $CrO_3$, using a .4 ampere current, and then removed from the solution and a counter-electrode applied, the voltage was raised to 27 volts in the reverse direction in ten minutes upon electro forming, by the application of a pulsating direct current in the reverse direction. At 18 volts it was found that the current flow in the reverse direction would be about five milliamperes. With further electro-forming for around several hours the reverse current passed by the disc at 40 volts was 15 milliamperes, and the forward conductivity at 1.1 volts A. C. was 140 milliamperes.

What is claimed is:

1. The method of treating a metallic selenium surface which comprises making the selenium an anode in a chromic acid solution.

2. The method of applying a blocking layer to a crystalline selenium surface which comprises anodically treating the surface in a chromic acid solution.

3. The method of applying a blocking layer to the surface of a crystalline layer of selenium adhering to a base which comprises anodically treating the selenium surface in a chromic acid solution.

4. The method of applying a blocking layer to an annealed selenium element which comprises treating it anodically in a solution composed of chromic oxide in water of a strength equivalent to between about ½% to 10% by weight of chromic oxide ($CrO_3$).

5. A metallic selenium layer covered with the anodic electro-deposition product of chromic acid on said layer.

6. A selenium cell comprising a layer of metallic selenium adhering to a base element, a blocking layer on the selenium surface composed of the anodic electro-deposition product of chromic acid, and a conducting counter-electrode covering said blocking layer.

7. A metallic selenium layer covered with a blocking layer of a substance containing chromium which is substantially the same as the anodic electro-deposition product of chromic acid on selenium.

ARTHUR von HIPPEL.
JAMES H. SCHULMAN.

REFERENCES CITED

The following references are of record in the file of this patent:

UNITED STATES PATENTS

| Number | Name | Date |
|---|---|---|
| 1,645,927 | Pierce | Oct. 18, 1927 |
| 1,774,269 | Haueisen | Aug. 26, 1930 |
| 2,391,706 | Jackson et al. | Dec. 25, 1945 |